(12) United States Patent
Dover

(10) Patent No.: US 12,047,508 B2
(45) Date of Patent: *Jul. 23, 2024

(54) LEVERAGING A TRUSTED PARTY THIRD-PARTY HSM AND DATABASE TO SECURELY SHARE A KEY

(71) Applicant: Lodestar Licensing Group, LLC, Evanston, IL (US)

(72) Inventor: Lance W. Dover, Fair Oaks, CA (US)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,442

(22) Filed: Sep. 9, 2022

(65) Prior Publication Data

US 2023/0006827 A1 Jan. 5, 2023

Related U.S. Application Data

(63) Continuation of application No. 17/014,215, filed on Sep. 8, 2020, now Pat. No. 11,444,771.

(51) Int. Cl.
*H04L 9/08* (2006.01)
*H04L 9/32* (2006.01)
(52) U.S. Cl.
CPC .......... *H04L 9/3226* (2013.01); *H04L 9/0866* (2013.01); *H04L 9/0894* (2013.01); *H04L 9/321* (2013.01); *H04L 9/3242* (2013.01)
(58) Field of Classification Search
CPC ......... H04L 9/06; H04L 9/0643; H04L 9/061; H04L 9/08; H04L 9/0866; H04L 9/0894;
(Continued)

(56) References Cited

U.S. PATENT DOCUMENTS 8,689,318 B2 4/2014 Proudler
9,432,339 B1 8/2016 Bowness
(Continued)

FOREIGN PATENT DOCUMENTS

KR 20090019402 2/2009

OTHER PUBLICATIONS

International Search Report and Written Opinion, PCT/US2021/049321, mailed on Dec. 3, 2021.
(Continued)

*Primary Examiner* — Shaqueal D Wade-Wright
(74) *Attorney, Agent, or Firm* — Greenberg Traurig

(57) ABSTRACT

The disclosed embodiments are related to securely updating a semiconductor device and in particular to a key management system. In one embodiment, a method is disclosed comprising storing a plurality of activation codes, each of the activation codes associated with a respective unique identifier (UID) of semiconductor device; receiving, over a network, a request to generate a new storage root key (SRK), the request including a response code and a requested UID; identifying a selected activation code from the plurality of activation codes based on the requested UID; generating the SHRSRK value using the response code and the selected activation code; associating the SHRSRK value with the requested UID and storing the SHRSRK value; and returning an acknowledgement in response to the request.

20 Claims, 6 Drawing Sheets

(58) Field of Classification Search
CPC ......... H04L 9/32; H04L 9/3226; H04L 9/321;
H04L 9/3242; H04L 63/06; H04L 63/062;
H04L 9/0631
See application file for complete search history.

(56) References Cited

U.S. PATENT DOCUMENTS

| | | |
|---|---|---|
| 9,923,890 B2 | 3/2018 | Hamburg et al. |
| 11,121,869 B1 | 9/2021 | Crahen et al. |
| 11,444,771 B2 | 9/2022 | Dover |
| 2014/0205092 A1 | 7/2014 | Hartley et al. |
| 2014/0359268 A1 | 12/2014 | Jauhiainen et al. |
| 2015/0113272 A1 | 4/2015 | Han et al. |
| 2015/0334114 A1* | 11/2015 | Scarlata .................. G06F 21/81 713/170 |
| 2017/0200010 A1 | 7/2017 | Fu et al. |
| 2018/0004444 A1* | 1/2018 | Murray ................. G06F 3/0673 |
| 2019/0163913 A1 | 5/2019 | Sun |
| 2020/0184078 A1 | 6/2020 | Hinrichs et al. |
| 2020/0313911 A1* | 10/2020 | Mondello ............. H04L 9/3268 |
| 2022/0075537 A1 | 3/2022 | Dover |
| 2022/0078009 A1* | 3/2022 | Gu ........................ H04L 9/0869 |
| 2022/0078018 A1 | 3/2022 | Dover |

OTHER PUBLICATIONS

Title: Leveraging a Trusted Party Third-party Hsm and Database to Securely Share a Key, U.S. Appl. No. 17/014,215, filed Sep. 8, 2020, Confirmation: 1635, Status Date: Aug. 24, 2022, Inventor: Lance Dover, Satus: Patented Case.

* cited by examiner

LEVERAGING A TRUSTED PARTY THIRD-PARTY HSM AND DATABASE TO SECURELY SHARE A KEY

RELATED APPLICATIONS

The present application is a continuation application of U.S. patent application Ser. No. 17/014,215 filed Sep. 8, 2020, the entire disclosures of which application are hereby incorporated herein by reference.

The present application relates to commonly-owned U.S. application Ser. No. 17/014,203, now U.S. Pat. No. 11,294, 582, and Ser. No. 17/014,206, filed simultaneously with the instant application, the disclosures of which are incorporated by reference in their entirety.

FIELD OF THE TECHNOLOGY

At least some embodiments disclosed herein relate generally to semiconductor devices and, in particular, to providing secure field upgrades to semiconductor devices.

BACKGROUND

Currently, many semiconductor devices (e.g., semiconductor memory devices) provide field-upgradable functionality that allows for post-fabrication updates to the devices. For example, a memory device may provide the ability to update the firmware of the memory device after the memory device is fabricated and installed. Securing these field upgrades is paramount to the reliable and trusted operation of such devices. Some devices utilize symmetric encryption to secure field upgrades. In these devices, a manufacturer and semiconductor device share a secret key and rely on these keys to encrypt and decrypt field upgrades. In a symmetric key system, the keys are unique between two parties (e.g., manufacturer and end-user). However, key distribution in such systems suffers from numerous deficiencies remedied by the disclosed embodiments.

First, many systems rely exclusively on cloud-based key distribution techniques. These techniques require an end-user (e.g., device owner) be connected to a public network to download keys. However, the requirement of a public network connection introduces potential security risks. Second, most cloud-based systems rely on unique identifier (UID) values to enable an end-user to request a symmetric key from a cloud-based platform. Generally, these UID values must read from the semiconductor device individually and uploaded individually. Thus, bulk access to symmetric keys is not feasible since the electrical identification of UID values is generally only available during manufacturing when access to a public network is not possible. Moreover, retrieving symmetric keys in a high-value manufacturing (HVM) environment is often not feasible given the temporal latency involved in the operation and the costs introduced by that latency.

DETAILED DESCRIPTION

The disclosed embodiments solve the aforementioned problems and other problems in the art. The disclosed embodiments allow end-users to activate capabilities in semiconductor devices using symmetric key cryptography in a manufacturing environment without requiring a connection to a public network and, ultimately, a cloud-based KMS. Further, the disclosed embodiments support requests for multiple symmetric keys at once. Further, the disclosed embodiments preserve the ability to prevent symmetric exposure end-to-end but do so for multiple devices at once when connecting to a KMS. These and other features are described in more detail with reference to the disclosed embodiments.

Figure 1:
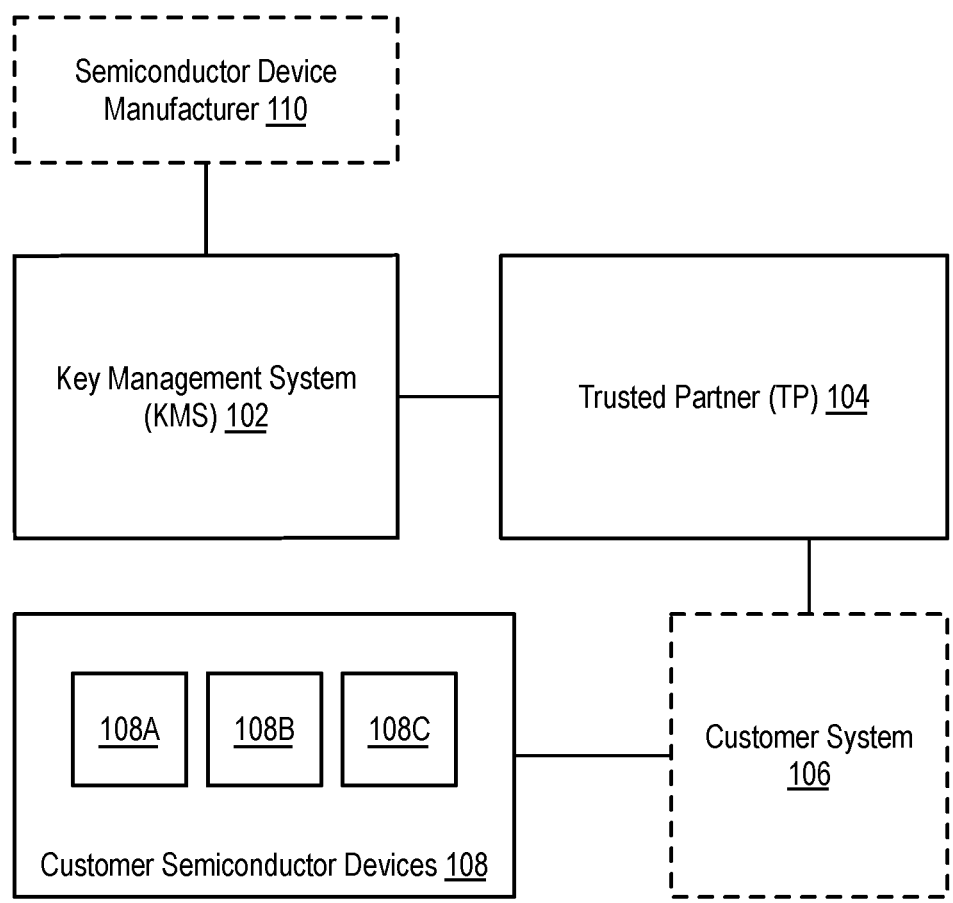
FIG. 1 is a block diagram illustrating an authentication system according to some embodiments of the disclosure.

FIG. 1 is a block diagram illustrating an authentication system according to some embodiments of the disclosure.

The illustrated system includes a semiconductor device manufacturer (110), KMS (102), trusted partner (TP) (104), customer system (106), and a plurality of semiconductor devices (108). In the illustrated embodiment, the manufacturer (110) is the manufacturer of devices (108). In the illustrated embodiment, the manufacturer (110) can communicate with the KMS (102) via a secure channel. In some embodiments, the manufacturer (110) uploads, for each device (108), a corresponding unique identifier (UID), and a device secret key, also referred to as a manufacturer's storage root key (MFGSRK) to the KMS (102). In the illustrated embodiment, the MFGSRK is generated in a secure manufacturing environment of the manufacturer (110). In some embodiments, the manufacturer (110) also uploads a customer identifier (CID) for each customer that purchases or otherwise is associated with a device (108). In some embodiments, the manufacturer also uploads a customer authentication key (CAK) associated with a CID. In one embodiment, the CAK is limited to a specified date range, thus becoming invalid after the last day of the range passes. The UID, MFGSRK, CID, and CAK values are collectively referred to as "manufacturing data."

In the illustrated embodiment, the KMS (102) stores the aforementioned data received from the manufacturer (110). In one embodiment, the KMS (102) comprises a server, or multiple servers, for storing the manufacturing data. In some embodiments, the KMS (102) utilizes a hardware security module (HSM) to secure the manufacturing data. In the illustrated embodiment, the KMS (102) is capable of generating activation codes for each of the received UIDs. In some embodiments, an activation code comprises an integer or similar processible value. In some embodiments, the KMS (102) generates an activation code in response to a request from TP (104).

In the illustrated embodiment, the TP (104) comprises a computing system that is securely and communicatively coupled to KMS (102). In the illustrated embodiment, the TP (104) issues network requests to the KMS (102) for batches of activation codes (also referred to as an activation database). In one embodiment, the request for an activation database includes the CID, a date range, a device type, and a nonce unique to a customer and known by the KMS (102) (referred to as "KMS nonce"). In some embodiments, a customer negotiates the KMS nonce with the KMS (102) via a network communication session, thus establishing a commonly known value for the KMS nonce. In the illustrated embodiment, the TP (104) receives and stores the contents of the activation database. In some embodiments, the TP (104) also includes an HSM for securing the activation database. In the illustrated embodiment, the TP (104) also includes processing capabilities for generating a message authentication code (MAC) for a given customer. Further, in the illustrated embodiment, the TP (104) includes processing capabilities for generating a secure database of shared device secrets based on the activation codes in the activation database and response codes received from semiconductor devices (108).

In the illustrated embodiment, the customer system (106) communicates with the TP (104). The customer system (106) may comprise a customer's manufacturing line or other systems for handling semiconductor devices (108). The specific arrangement of computing devices of the customer system (106) is not limited herein. In some embodiments, TP (104) comprises one or more secure computing devices installed within a customer system (106). In other embodiments, the TP (104) is a separate computing system from the customer system (106).

In the illustrated embodiment, the customer system (106) interacts with a plurality of semiconductor devices (108a), (108b), (108c) (collectively, 108). The devices (108) comprise semiconductor devices such as, but not limited to, memory devices. For example, devices may comprise NOR or NAND Flash memory chips, system-on-a-chip (SoC) devices, or other types of discrete semiconductor packages.

The devices (108) include a plurality of non-volatile storage locations for storing various fields and parameters such as a CID and CAK. The devices (108) additionally include hardware or firmware capable of performing cryptographic operations such as operations supporting a MAC. Examples of such operations include HMAC-SHA256, AES, and CMAC operations. One example of a device (108) is provided in the description of FIG. 5, the disclosure of which is incorporated herein by reference in its entirety.

Figure 2:
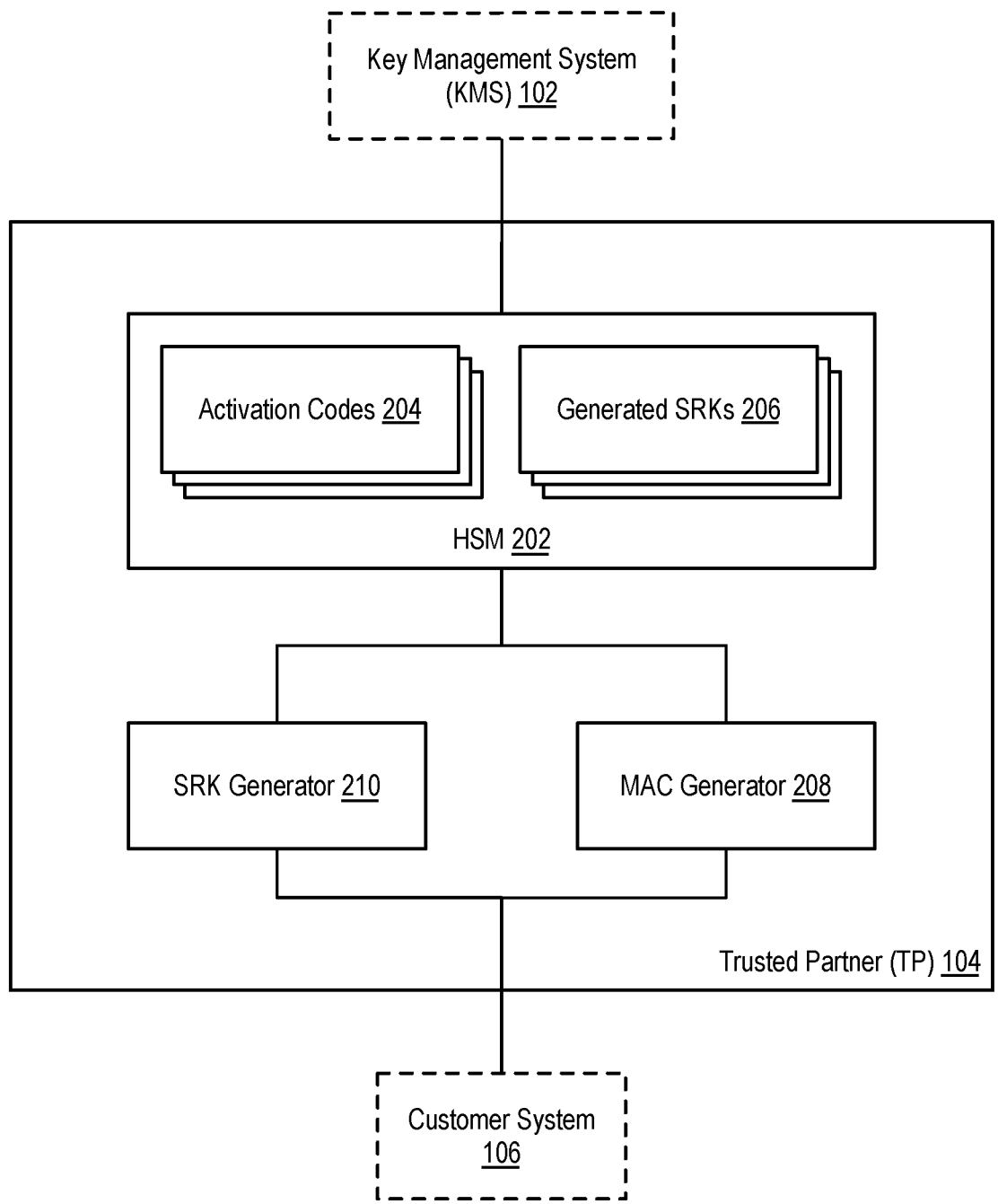
FIG. 2 is a block diagram illustrating a trusted partner (TP) system according to some embodiments of the disclosure.

FIG. 2 is a block diagram illustrating a trusted partner (TP) system according to some embodiments of the disclosure.

In the illustrated embodiment, a TP (104) comprises a secure processing platform for managing key usage by semiconductor devices. The illustrated TP (104) allows for customer-specific batch mode activations of semiconductor devices (108). In the illustrated embodiment, a customer system (106) downloads a database of activation codes (204) for all semiconductor devices (108) of a particular type. A customer may interact with the semiconductor devices (108) offline, and may also use TP (104) to activate offline to provision devices. That is, the TP (104) may not require a connection to KMS (102) since it maintains the activation codes and functionality described herein. That is, the TP (104) does not require a constant or consistent connection to the KMS (102). However, in some embodiments, the TP (104) must have a connection to the KMS (102) initially to retrieve an activation database.

The use of TP (104) provides numerous advantages over existing key management solutions. First, activation codes stored locally in TP (104) database can only be used by the intended customer since they are based on that customer's CID. Second, an activation code can be used to activate SRKs (including MFGSRKs and SHRSRKs, as used herein an "SRK" refers to any storage root key generated by the TP, 104) at the TP (104) or semiconductor device (108) for all customer devices without cloud connectivity. Third, each activation code within a database is device-specific and only works for the intended device, based on the device's MFGSRK. Fourth, the activation code database can be rendered no longer functional if the KMS nonce is not known. Fifth, activating semiconductor devices (108) using the TP (104) can be set to only happen for the first provisioning of the semiconductor devices (108), i.e., before the device has ever been provisioned. Sixth, a manufacturer (110) can track which (e.g., how many) devices have been activated based on a report from TP (104). These and other advantages are described more fully herein.

In the illustrated embodiment, the TP (104) is communicatively coupled to both KMS (102) and customer systems (106). In some embodiments, both connections comprise secure communications channels such as a network connection secured using a transport layer security (TLS) protocol, secure sockets layer (SSL) protocol, or similar secure protocol. In these embodiments, the communications may be packetized using transmission control protocol (TCP), user datagram protocol (UDP), or the like. In some embodiments, a higher-level protocol such as Hypertext Transfer Protocol (HTTP) may be used. In some embodiments, the secure connections are also established by the TP (104) logging into the KMS (102) or by the customer system (106) logging into the TP (104). In some embodiments, this logging in may be accomplished via a username and password, a secure token, or other similar security mechanisms.

In the illustrated embodiment, the TP (104) includes various processing components including a storage root key (SRK) generator (210), message authentication code (MAC) generator (208), and a hardware security module (HSM) (202). These components (202, 208, 210) may comprise dedicated hardware devices (e.g., servers) running software configured to perform the operations described herein (and, in particular, in the descriptions of FIGS. 3, 4A, and 4B). Alternatively, some or all of the components (202, 208, 210) may be implemented in a single device. For example, the components (202, 208, 210) may be implemented in software on a single server. In some embodiments, a hybrid approach may be taken, and some components (202, 208, 210) may be implemented in software, others in hardware, and still others in a combination of hardware and software. For example, in one embodiment, a server executes software to implements the SRK generator (210) and MAC generator (208), while a physical device running secure software implements the HSM (202), the physical device being communicatively coupled to the server running the SRK generator (210) and MAC generator (208).

The TP (104) additionally includes an HSM (202). The HSM (202) comprises a physically separate storage layer for storing sensitive data such as activation codes (204) and SRK (206) values. In some embodiments, the HSM (202) comprises a separate, physical computing device such as a dedicated server. In other embodiments, the HSM (202) may comprise a pluggable device that connects to one or more of the servers implemented by the TP (104). The HSM (202) may include one or more cryptographic processors for securing data therein. The HSM (202) may have tamper detection functionality.

In the illustrated embodiment, the HSM (202) stores activations codes (204). The activation codes (204) are generated by the KMS (102) and returned to the TP (104) in response to a request for the activation codes (204). In some embodiments, the request comprises a command generated by the TP (104) and sent to KSM (102) that includes one or more parameters. In one embodiment, the command has a fixed name or opcode to allow the KMS to identify the command. In another embodiment, the command may comprise an endpoint such as an HTTP endpoint and the issuance of, for example, a GET request to the endpoint comprises the command identifier. In some embodiments, the one or more parameters include a Customer ID (CID) value, a KMS nonce, a date range, and a device type.

In the illustrated embodiment, a CID comprises a unique identifier that uniquely identifies a customer. As used herein, a customer refers to any entity that utilizes semiconductor devices. For example, a customer may comprise a manufacturer of electronic devices that include semiconductor devices. In the illustrated embodiments, the CID is known by the customer as well as all entities depicted in FIG. 1. In some embodiments, the CID may be written by the manufacturer.

In one embodiment, a CAK comprises a symmetric key. In one embodiment, the manufacturer (110) maintains the CAK for the given customer. Thus, the manufacturer (110) may store CAKs for each customer, and each customer stores its own CAK. In one embodiment, the CAK is periodically updated (e.g., at regular intervals). In the illustrated embodiment, the CAK may be written by the manufacturer (110) when manufacturing the device. The manufacturer (110) may periodically transmit CID-CAK pairs to the KMS (102). The KMS (102) may additionally transmit CAKs to the TP (104) along with activation codes for multiple devices. In some embodiments, the HSM (202) is further configured to store CID and CAK values when receiving the activation codes (204).

In the illustrated embodiment, the date range and device type may comprise a selectable parameter used to identify a subset of a customer's devices. In one embodiment, the TP (104) issues a request to the KMS (102) for devices by supplying the date range and device type. As discussed, the CID and KMS nonce values are also included in this request. The KMS (102) uses these parameters to extract a set of UID-MFGSRK pairs matching the date range and/or device type.

As an example, a UID may include a date range and a device type within the format of the UID. For example, the UID may include a product code and a date, as well as other data. In this scenario, the KMS (102) may generate a regular expression query or similar query in a language such as structured query language (SQL). For example, the KMS (102) may search for any UIDs match the pattern "PROD20200101*" where "PROD" is a device type, "20200101" is a date (Jan. 1, 2020) within the received data range, and "*" represents zero or more arbitrary characters appearing after the date range. Certainly, other formats and methods of querying may be used, and the disclosure is not limited to a specific UID format. As can be seen, the device type and date range values stored in the request are used by the KMS (102) to identify UID-MFGSRK pairs. As described more fully in commonly-owned co-pending application Ser. No. 17/014,206, the KMS (102) returns a set of activation codes for each identified UID and also returns one or more CAKs corresponding to the activation codes. Since CAK values may change over time, the KMS (102) returns the CAKs associated with the UIDs at the time of UID creation. The HMS (202) may include a dedicated storage area for CAKs. In some embodiments, the returned activation codes additionally include associated UIDs, thus mapping UIDs to activation codes. As with CAKs, these UIDs may be stored in the HSM (202).

In the illustrated embodiment, the KMS (102) generates a unique activation code for each UID in the UID-MFGSRK pairs. As described in more detail, the activation code may be generated based on the MFGSRK and, in some embodiments, the customer nonce as well. The KMS (102) re-maps the UID values to the activation codes, generating an activation code database. In the illustrated embodiment, the KMS (102) removes the MFGSRKs and does not transmit these keys to the TP (104). Thus, the KMS (102) transmits UID-activation code pairs to the TP (104).

Figure 3:
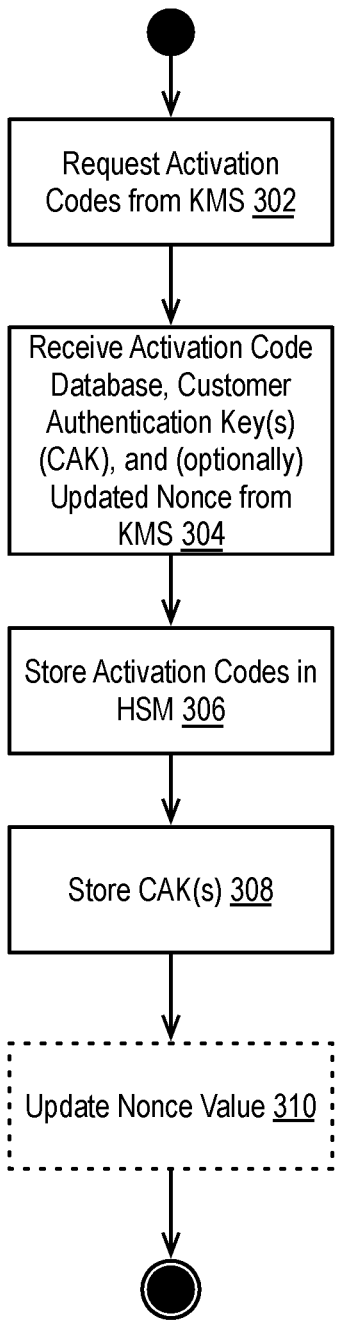
FIG. 3 is a flow diagram illustrating a method for retrieving and processing an activation code database according to some embodiments.

Further detail regarding the retrieval and storage of activation codes is discussed in more detail in the description of FIG. 3.

As will be described in more detail in the descriptions of FIGS. 4A and 4B, but as generally discussed herein, the TP (104) additionally performs SRK generation functions and MAC generation functions via SRK generator (210) and MAC generator (208), respectively.

In the illustrated embodiment, the SRK generator (210) is configured to generate a new storage root key (SHRSRK) for a given device (e.g., 108). In one embodiment, the SRK generator (210) receives requests to generate a SHRSRK value from a customer system (106). In one embodiment, the request may come directly from a device (108). In either scenario, the request includes a response code generated by the device (108) and a UID of a corresponding device. In some embodiments, the SRK generator (210) receives a batch of UID—response code pairs and generates SHRSRK values for each UID. In one embodiment, the SHRSRK value is generated using the received response code and a corresponding activation code. In one embodiment, the method uses a MAC function to generate a SHRSRK value for a given UID. In one embodiment, this MAC function comprises an HMAC function. In one embodiment, the method uses the response code received in the request as the key to an HMAC function. In this embodiment, the method further uses the activation code as the message to encode using the HMAC. As described in commonly-owned U.S. application Ser. No. 17/014,203, now U.S. Pat. No. 11,294,582, the device (108) is capable of performing the same computation locally; thus a device (108) and TP (104) simultaneously can generate the appropriate SHRSRK value. Since the SHRSRK value is based on the activation code, and the activation code is based on the value of MFGSRK, which is private, the SHRSRK value is secured from third-party generation. In some optional embodiments, after generating the SHRSRK value, the SRK generator (210) returns the SHRSRK value to the customer system (106). In an alternative embodiment, the SRK generator (210) may only return a success or failure error code to the calling party (e.g., customer system 106) and maintain the SHRSRK value as a secret.

In addition to the generation of SRKs, the TP (104) additionally includes a MAC generator (208). In the illustrated embodiment, the MAC generator (208) is configured to receive a message from the customer system (106) and generate a corresponding MAC for the message. The MAC generator (208) then returns the generated MAC to the customer system. In one embodiment, the MAC is generated using an HMAC function. In one embodiment, the HMAC function uses the CAK as the key and a corresponding message as the value to be hashed. In one embodiment, the MAC generator (208) receives a CID value and UID value from the customer, these values may be part of a provision command, described more fully in commonly-owned U.S. application Ser. No. 17/014,203, now U.S. Pat. No. 11,294, 582. In one embodiment, the provision command additionally includes a KMS nonce value. The MAC generator (208) extracts the CID from the command and identifies a corresponding CAK for the UID. As described above, CAKs may vary over time, and the KMS (102) returns CAK values for a given set of UID-activation code pairs. Thus, the TP (104) uses the UID to identify a corresponding CAK received from the KMS (102). The message then performs an HMAC operation on the received message (which includes a CID value and KMS nonce) using the CAK as the key. The MAC generator (208) then returns the MAC to the customer system (106). As described in commonly-owned U.S. application Ser. No. 17/014,203, now U.S. Pat. No. 11,294,582, the MAC is included in the provision command sent from a customer system (106) to a device (108). The device (108) can authenticate the MAC due to the private storage of the appropriate CAK. As illustrated, the method of FIG. 3 allows only authorized customers (e.g., those with a known CID and associated CAK) to provision a given semiconductor device.

FIG. 3 is a flow diagram illustrating a method for retrieving and processing an activation code database according to some embodiments. In the illustrated embodiment, the method depicted may be executed by one or more servers of a TP (104).

In step 302, the method requests one or more activation codes from a KMS. In one embodiment, a TP (104) establishes a secure connection with the KMS (102) and issues a network request for activation codes. In one embodiment, the request includes a KMS nonce value, CID value, date range, and device type. Various details of these parameters have been described and are not repeated herein.

In step 304, the method receives an activation code database as well as a CAK and, in some embodiments, an updated KMS nonce value. In one embodiment, the KMS (102) transmits a set of UID-activation code pairs that are responsive to the request transmitted in step 302. In one embodiment, an activation code comprises a fixed-length value generated by the KMS (102). Details of the generation of an activation code are provided in commonly-owned co-pending application Ser. No. 17/014,206. In brief, the activation code can be generated by the KMS according to the following algorithm:

$$\text{Activation Code} = \text{HMAC}(\text{SHA256}(\text{CID} \| \text{KMS Nonce}), \text{MFGSRK}),$$

where HMAC comprises HMAC function, SHA256 comprises a SHA-256 function, CID and KMS nonce comprise the CID and KMS nonce transmitted in step 302, and MFGSRK comprises the manufacturer's storage root key. As illustrated, the HMAC function uses the output of the SHA256 as a key and the value of MFGSRK as the message to encode.

In one embodiment, the KMS (102) also returns one or more CAK values along with the activation codes. Since CAK values may change over time, the KMS (102) identifies all CAKs used or valid in the date range of the request and returns the CAK values along with the activation code.

Finally, in some embodiments, the KMS (102) will update the value of KMS nonce and return the updated value. The TP (104) will then replace the value of KMS nonce with the updated value. In an alternative embodiment, the TP (104) maintains a historical record of KMS nonces and adds the updated KMS nonce to a list of KMS nonces. In some embodiments, the value of KMS nonce may comprise a monotonic counter value.

In step 306, the method stores the activation codes in an HSM. In one embodiment, the method stores the UIDs along with the activation codes. In some embodiments, the activation codes are stored in a relational database. In these embodiments, the UID and corresponding activation codes may be stored in the same row of a table of the relational database. In some embodiments, the row additionally includes the CID value used to retrieve the activation codes.

In step 308, the method stores the received CAKs. In some embodiments, the CAK values are stored in a separate storage area. In these embodiments, the CAK values are also stored with a relevant date range and a CID value to enable ad hoc queries.

In another embodiment, the CAK value associated with a given UID-activation code pair may be stored in the relational database used to store the activation codes. In some embodiments, the CAK values may be stored in a separate database table that maps CID values to CAK values. Each CID-CAK mapping additionally includes a data range that the CAK is or was valid. In one embodiment, the table storing UID-activation code pairs may include a reference (e.g., foreign key) referencing the relevant CAK. Alternatively, the UID-activation table may store a date that can be used to identify the relevant CAK. In another alternative embodiment, the UID-activation table may include a CAK directly in a row, thus the UID-activation table will include a CID value, UID-activation pair, and CAK value. In this manner, storage space is duplicated, but accessing all relevant data for a UID-activation code pair can be performed in a single lookup and without a JOIN operation.

Finally, in step 310, the method updates the value of KMS nonce. As described above, step 310 may be optional. In one embodiment, the method only stores the current KMS nonce value (e.g., in the HSM) and simply overwrites the current value with a new value received in step 304. In an alternative embodiment, the method may store KMS nonce values in a separate storage area (e.g., a database table) and may append the new KMS nonce values to a list of previous KMS nonce values. In some embodiments, the method associates a date with each new KMS nonce value, to support historical queries. In one alternative embodiment, the method may write the current KMS nonce value to the storage area storing the UID-activation code pairs prior to updating the KMS nonce value. Thus, continuing the previous example, the HSM may include a CID value, UID-activation pair, a CAK value, and the value of KMS nonce used to retrieve the activation code.

Other storage techniques may be used, and the above description of relational database storage techniques may be equally applied to non-relational database (e.g., document-oriented storage or key-value stores) without significant creative effort.

Figure 4A:
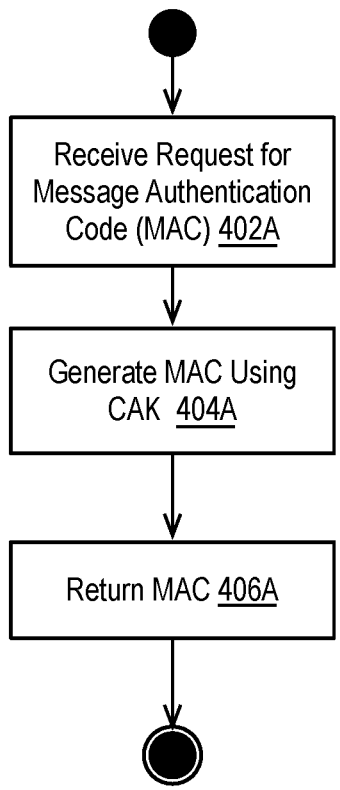
FIG. 4A is a flow diagram illustrating a method for generating a message authentication code (MAC) according to some embodiments.

FIG. 4A is a flow diagram illustrating a method for generating a message authentication code (MAC) according to some embodiments. The method illustrated in FIG. 4A is performed by the TP (104) in response to a request from a customer system (106). In general, the customer system (106) does not include the capability to sign requests issued to the semiconductor devices (108). Thus, only systems authorized by the TP (104) can sign and issue commands to the semiconductor devices (108). To enable this, the TP (104) provides a MAC generation function that can be accessed by the customer systems.

In step 402a, the method receives a request for a MAC.

In some embodiments, the method receives the request over a secure communications channel such as a network connection secured using a transport layer security (TLS) protocol, secure sockets layer (SSL) protocol, or similar secure protocol.

In one embodiment, the request includes an unsigned command (e.g., a provision command, described previously), the command including a command identifier and zero or more parameters. In one embodiment, the parameters include a CID value and a KMS nonce value. In one embodiment, the parameters further include a UID associated a semiconductor device destined to receive the command.

In step 404a, the method generates a MAC using a CAK. In the illustrated embodiment, step 404a may include various sub-steps, described herein.

As part of step 404a, the method may first authenticate the request for a MAC. As described above, the TP (104) may require that the customer system (106) authenticate with the TP (104) prior to issuing any commands, thus ensuring that a customer is authenticated before performing the method in FIG. 4A. Next, the method may verify that the received parameters are valid. For instance, the method may confirm that a CID and UID are both properly formatted and known to the TP (104). This validation ensures that arbitrary CID and UID values are not processed.

Next, the method identifies a CAK to use to generate the MAC. In the illustrated embodiment, the method identifies a CAK associated with a UID. As described above, CAKs vary over time, but each UID is associated with a single CAK, the CAK that was valid when the UID was generated. The method uses the database of UID-activation codes, and the CAK values received as part of the process described in the description of FIG. 3. For example, the method may query a database table using the CID and UID, and in response, receives the activation code and CAK value written when receiving the activation codes. Since the customer system does not have access to the CAK, the TP (104) executing the method in FIG. 4A effectively manages access to private CAK values. Further, the TP (104) stores a historical record of CAK values for each UID, allowing the TP (104) to provision semiconductor devices after the current CAK value has changed.

Finally, the method generates a MAC using the CAK. In one embodiment, the method uses an HMAC function to generate the MAC. In one embodiment, the method uses the appropriate CAK as the key to the HMAC and the received command as the message payload.

In step 406a, the method returns the MAC to the customer system. In the illustrated embodiment, the method returns the MAC via the secure channel used to transmit the request in step 402a.

Figure 4B:
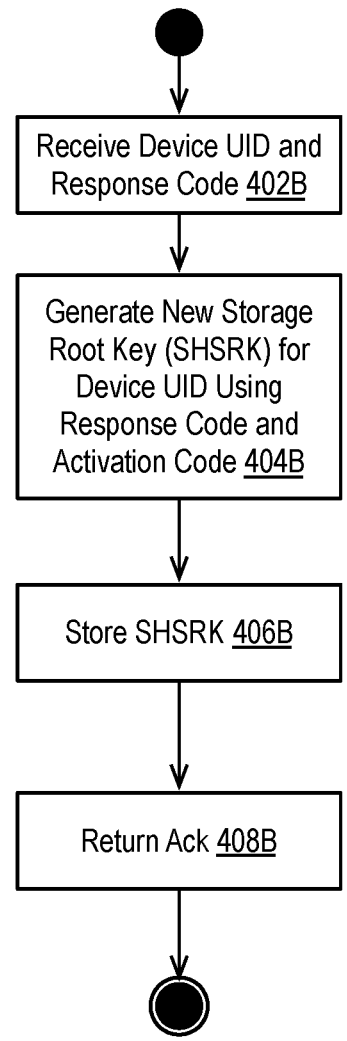
FIG. 4B is a flow diagram illustrating a method for generating a storage root key (SRK) according to some embodiments.

FIG. 4B is a flow diagram illustrating a method for generating a storage root key (SRK) according to some embodiments.

In step 402b, the method receives a device UID and associated response code. In the illustrated embodiment, the UID is read by a customer system from the associated semiconductor device. The UID may be read electrically or via a camera or other recording device. In the illustrated embodiment, the response code is read by accessing the storage of the semiconductor device after issuing a provision command and reading the response code generated onboard the semiconductor device. Details of generating a response code are provided in commonly-owned U.S. application Ser. No. 17/014,203, now U.S. Pat. No. 11,294,582. In general, the response code can be generated as follows:

$$\text{Response Code} = \text{HMAC}(\text{MTC}, \text{HMAC}(\text{SHA256}(\text{CID}, \text{KMS Nonce}), \text{MFGSRK})$$

where CID and KMS Nonce are provided by the customer system to the semiconductor device in the provision command, MFGSRK represents the secret manufacturer's original storage root key, MTC comprises the value of a public monotonic counter on the semiconductor device, HMAC comprises an HMAC function such as HMAC-SHA256, and SHA256 comprises a hashing algorithm implementing the SHA-256 algorithm.

In the illustrated embodiment, the response code is publicly accessible on the semiconductor device. Thus, the customer system reads the response code and uploads the response code and corresponding UID to the TP (104) in step 402b.

In step 404b, the method generates a new storage root key (SHRSRK) using the response code, UID, and activation code associated with the UID. Similar to FIG. 4A, the method may perform various validation on CID and UID values to confirm access before proceeding and those validations are not repeated herein.

After validating the request, the method accesses the HSM to retrieve an activation code associated with the UID received from the customer system. The method then uses the activation code and response code to generate a SHRSRK value. In one embodiment, the method computes the SHRSRK value using a MAC function. In one embodiment, the MAC function comprises an HMAC function, such as HMAC-SHA256. In one embodiment, the method uses the response code as the key to the HMAC function and the activation code as the message to encode. Thus, the method may compute the value of SHRSRK as follows:

$$\text{SHRSRK} = \text{HMAC}(\text{Response Code}, \text{Activation Code})$$

Since the value of SHRSRK is based on a private activation code, the value of SHRSRK is secret to the TP and device that generated the response code.

In step 406b, the method stores the newly generated SHRSRK value along with the activation code and UID. In some embodiments, the method inserts the value of SHRSRK into the HSM along with the activation code and UID. For instance, the method may store the SHRSRK value in a dedicated storage area and associate the SHRSRK with the UID to enable the lookup of the SHRSRK value using the UID.

In step 408b, the method acknowledges the creation of the SHRSRK by returning an appropriate response code. In one embodiment, the method is accessed via an endpoint such as an HTTP endpoint. In the illustrated embodiment, the method does not return the contents of SHRSRK to ensure the protection of the SHRSRK. Instead, the method returns a status code indicating the results of the key generation process. Thus, as one example, the method may return an HTTP 200 status code indicating the key generation process in step 404b was successful or an HTTP 500 status code indicating the key generation process was not successful.

Once step 408b completes, the TP (104) and device (108) both include the new SHRSRK. However, the SHRSRK value has not yet been activated on the device (108). In one embodiment, the customer system (106) will transmit a second command to the TP (104) to receive a second MAC. In one embodiment, this second command comprises a replace key command. In one embodiment, the method performs a process similar to that described in FIG. 4A. That is, the method generates a MAC using the CAK associated with the UID. In one embodiment, the replace key command includes the CID and KMS nonce value and the MAC thus is generating using the CID and KMS nonce values as the message. In one embodiment, the customer system (106) will confirm that the device (108) has generated the value of SHRSRK by transmitting a confirmation to the TP (104). In some embodiments, the TP (104) will commit the independently generated SHRSRK value upon receiving such confirmation.

In an alternative embodiment of FIG. 4A, the TP (104) may sign a replace key command using the SHRSRK instead of the CAK. Since only the device and the TP have access to the SHRSRK, and the TP only has access to SHRSRK after successfully generating the SHRSRK in FIG. 4B, use of the SHRSRK in lieu of the CAK ensures that both TP and device have access to the SHRSRK before the device commits the SHRSRK to serve as the primary SRK. When receiving the replace key command, the device validates the MAC before replacing the MFGSRK with the value of SHRSRK. Thus, in this embodiment, the TP must obtain SHRSRK before being capable of generating a valid MAC, ensuring synchronization between the TP and semiconductor device.

As described above, the TP (104) manages key storage and generation on behalf of a customer system. In general, the customer interacts with the TP (104) and semiconductor device (108) in the following manner. First, the customer system queries a semiconductor device to obtain a UID. This may be performed electrically or visually (e.g., via image recognition). Next, the customer system constructs a command such as a provision command to issue to the device associated with the UID. The customer system transmits this command to the TP to receive a MAC. The customer system then adds the MAC to the command sent to the TP and issues the command and MAC to the semiconductor device. Since the MAC is generated using a secret CAK and this CAK is shared among the manufacturer, KMS, TP, and device, the device can independently verify the MAC before executing the command. In response to, for example, a provision command, the semiconductor device generates an activation code and response code and returns only the response code to the customer system. The customer system transmits this response code to the TP which, in turn, generates a new storage root key. The TP responds indicating that the generation of a new storage root key was successful. Next, the customer transmits a second command (e.g., a replace key command) to the TP and receives a second MAC. The customer system then issues this replace key command and the second MAC to the semiconductor device. After the semiconductor device verifies the second MAC, the original MFGSRK is replaced with the candidate key generated on the semiconductor device and is then used as the new storage root key. At the end of the process, the TP and semiconductor device both hold the value of the new storage root key while the customer system, manufacturer, and KMS no longer have access to the storage root key in use.

Figure 5:
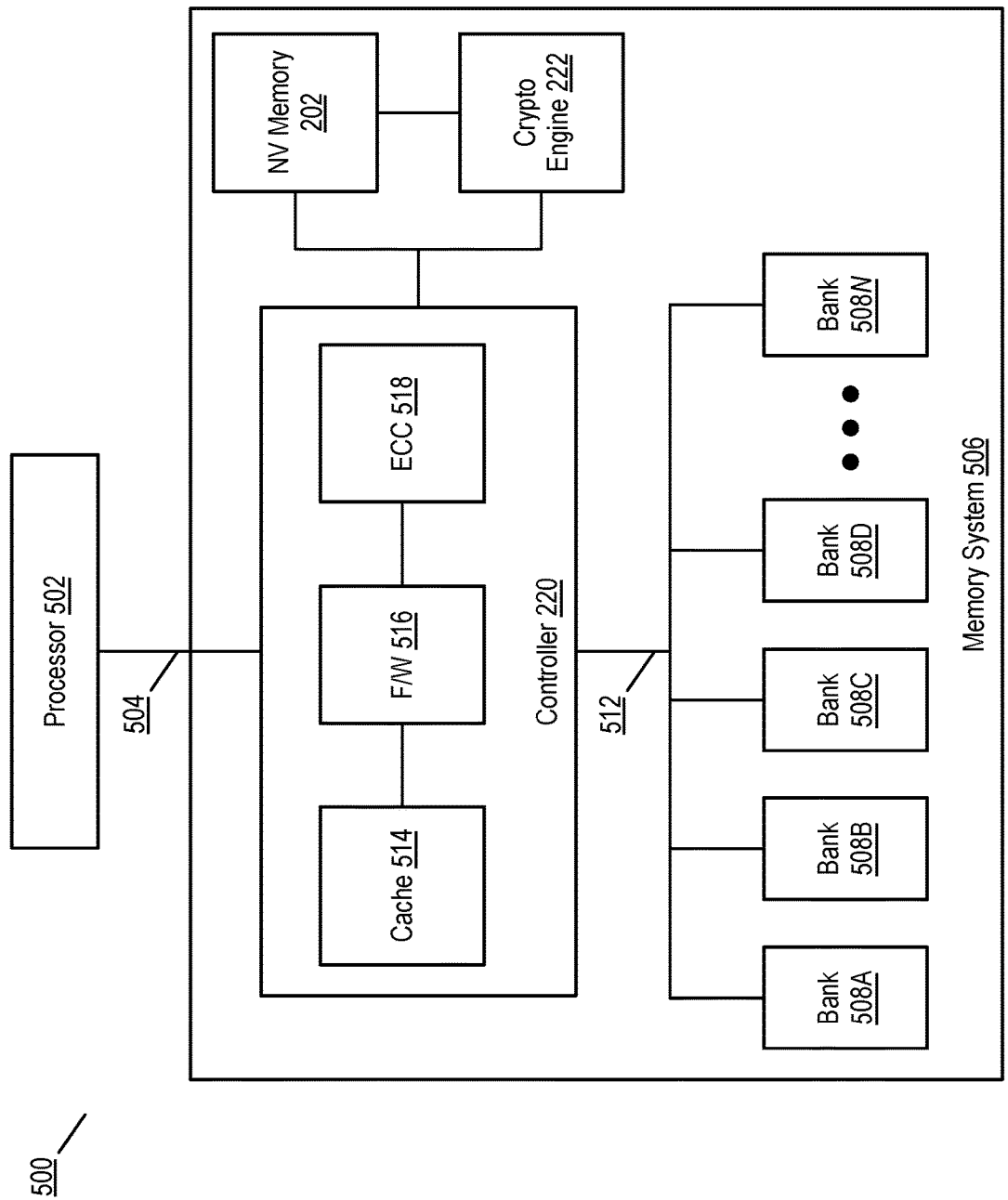
FIG. 5 is a block diagram illustrating a memory system according to some embodiments of the disclosure.

FIG. 5 is a block diagram illustrating a memory system according to some embodiments of the disclosure.

As illustrated in FIG. 5, a computing system (500) includes a processor (502) communicatively coupled to a memory system (506) via a bus (504). The memory system (506) comprises a controller (220) communicatively coupled to one or more memory banks (508A 1V) via a bus/interface (512). As illustrated, the controller (220) includes a local cache (514), firmware (516), and ECC module (518).

In the illustrated embodiment, processor (502) can comprise any type of computing processor such as a central processing unit, graphics processing unit, or other type of general or special-purpose computing device. Processor (502) includes one or more output ports that allow for the transmission of address, user, and control data between processor (502) and the memory system (506). In the illustrated embodiment, this communication is performed over bus (504). In one embodiment, the bus (504) comprises an input/output (I/O) bus or similar type of bus.

The memory system (506) is responsible for managing one or more memory banks (508A-508N). In one embodiment, the banks (508A-508N) comprise NAND Flash dies or other configurations of non-volatile memory.

The banks (508A-508N) are managed by the controller (220). In some embodiments, the controller (220) comprises a computing device configured to mediate access to and from banks (508A-508N). In one embodiment, the controller (220) comprises an ASIC or other circuitry installed on a printed circuit board housing the banks (508A-508N). In some embodiments, the controller (220) may be physically separate from the banks (508A-508N). Controller (220) communicates with the banks (508A-508N) over interface (512). In some embodiments, this interface (512) comprises a physically wired (e.g., traced) interface. In other embodiments, the interface (512) comprises a standard bus for communicating with banks (508A-508N).

Controller (220) comprises various modules (514-518). In one embodiment, the various modules (514-518) comprise various physically distinct modules or circuits. In other embodiments, the modules (514-518) may completely (or partially) be implemented in software or firmware.

As illustrated, firmware (516) comprises the core of the controller and manages all non-cryptographic operations of the controller (220). Cryptographic engine (222) is provided for cryptographic operations, as described in more detail in commonly owned U.S. application Ser. No. 17/014,203, now U.S. Pat. No. 11,294,582, the disclosure of which is incorporated herein by reference in its entirety. In brief, the cryptographic engine (222) is configured to perform MAC calculations. These MAC calculations are used to generate new secret keys to replace an existing manufacturers secret key. Further detail is provided in commonly owned U.S. application Ser. No. 17/014,203, now U.S. Pat. No. 11,294, 582.

Thus, firmware (516) mediates access to banks (508A-508N) for non-cryptographic operations. As illustrated, both controller (220) and engine (222) access non-volatile (NV) storage (202). Details of accessing NV storage (202) are provided in the description of commonly owned U.S. application Ser. No. 17/014,203, now U.S. Pat. No. 11,294,582, and are not repeated herein.

Figure 6:
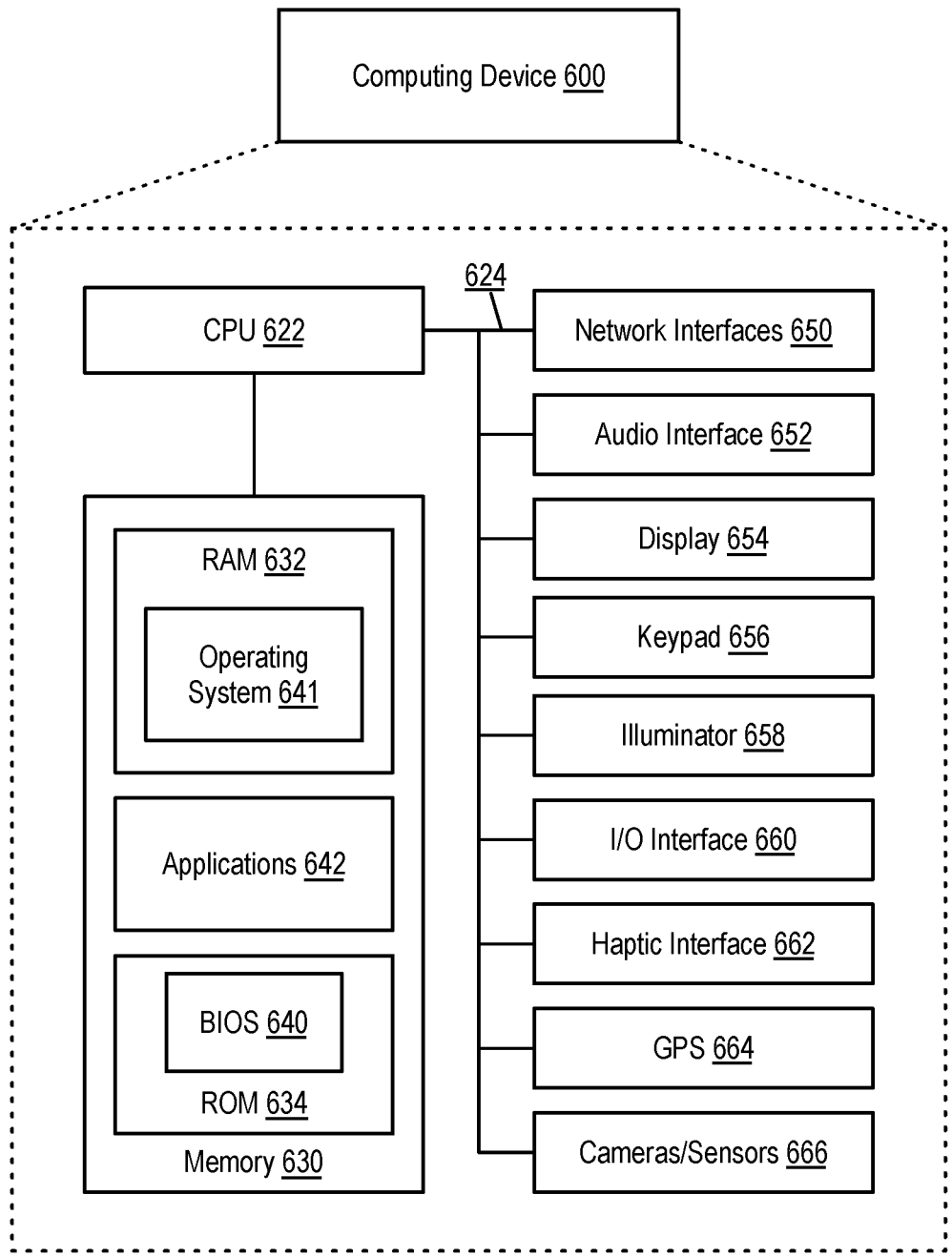
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure. The device (600) may comprise a computing device used by manufacturer (110), KMS (102), TP (104), or customer system (106). Further, various components (e.g., 730, 734) may comprise a device including a semiconductor device (108) or may comprise the semiconductor device (108) itself.

The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown), or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth™, or the like. The haptic interface (662) provides tactile feedback to a user of the client device.

Optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600).

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   storing a plurality of activation codes;
   receiving, over a network, a request including a response code; and
   generating a new storage root key (SRK) for a given semiconductor device using the response code and a corresponding activation code.

2. The method of claim 1, further comprising storing at least one customer authentication key (CAK), the CAK associated with at least one activation code and a corresponding unique identifier (UID).

3. The method of claim 2, further comprising:
   receiving a request for a message authentication code (MAC), the request including the corresponding UID and a command;
   identifying the at least one CAK based on the corresponding UID;
   generating the MAC using a hash-based MAC (HMAC) function, wherein the CAK is used as a key of the HMAC function and the command is used as a message of the HMAC function; and
   returning the MAC in response to the request.

4. The method of claim 3, the command including a customer identifier (CID) and a nonce value.

5. The method of claim 1, further comprising:
   transmitting a request for an activation code database to a key management server (KMS);

receiving, in response to the request, the activation code database, the activation code database comprising the plurality of activation codes; and storing the activation code database in a hardware security module.

6. The method of claim 1, wherein generating the SRK comprises generating a MAC via an HMAC function.

7. The method of claim 6, wherein generating the MAC further comprises using the response code as a key of the HMAC function and an activation code as a message of the HMAC function.

8. A non-transitory computer-readable storage medium for tangibly storing computer program instructions capable of being executed by a computer processor, the computer program instructions defining steps of:

storing a plurality of activation codes;

receiving, over a network, a request including a response code; and generating a new storage root key (SRK) for a given semiconductor device using the response code and a corresponding activation code.

9. The non-transitory computer-readable storage medium of claim 8, the steps further comprising storing at least one customer authentication key (CAK), the CAK associated with at least one activation code and a corresponding unique identifier (UID).

10. The non-transitory computer-readable storage medium of claim 9, the steps further comprising:

receiving a request for a message authentication code (MAC), the request including the corresponding UID and a command;

identifying the at least one CAK based on the corresponding UID;

generating the MAC using a hash-based MAC (HMAC) function, wherein the CAK is used as a key of the HMAC function and the command is used as a message of the HMAC function; and returning the MAC in response to the request.

11. The non-transitory computer-readable storage medium of claim 10, the command including a customer identifier (CID) and a nonce value.

12. The non-transitory computer-readable storage medium of claim 8, the steps further comprising:

transmitting a request for an activation code database to a key management server (KMS);

receiving, in response to the request, the activation code database, the activation code database comprising the plurality of activation codes; and storing the activation code database in a hardware security module.

13. The non-transitory computer-readable storage medium of claim 8, wherein generating the SRK comprises generating a MAC via an HMAC function.

14. The non-transitory computer-readable storage medium of claim 13, wherein generating the MAC further comprises using the response code as a key of the HMAC function and an activation code as a message of the HMAC function.

15. A device comprising:

a processor; and a non-transitory computer-readable storage medium for tangibly storing thereon logic for execution by the processor, the logic comprising instructions for:

storing a plurality of activation codes;

receiving, over a network, a request including a response code; and generating a new storage root key (SRK) for a given semiconductor device using the response code and a corresponding activation code.

16. The device of claim 15, the instructions further comprising storing at least one customer authentication key (CAK), the CAK associated with at least one activation code and a corresponding unique identifier (UID).

17. The device of claim 16, the instructions further comprising:

receiving a request for a message authentication code (MAC), the request including the corresponding UID and a command;

identifying the at least one CAK based on the corresponding UID;

generating the MAC using a hash-based MAC (HMAC) function, wherein the CAK is used as a key of the HMAC function and the command is used as a message of the HMAC function; and returning the MAC in response to the request.

18. The device of claim 17, the command including a customer identifier (CID) and a nonce value.

19. The device of claim 15, the instructions further comprising:

transmitting a request for an activation code database to a key management server (KMS);

receiving, in response to the request, the activation code database, the activation code database comprising the plurality of activation codes; and storing the activation code database in a hardware security module.

20. The device of claim 15, wherein generating the SRK comprises generating a MAC via an HMAC function.

* * * * *